US008585389B2

(12) United States Patent
Grashuis et al.

(10) Patent No.: US 8,585,389 B2
(45) Date of Patent: Nov. 19, 2013

(54) DEVICE FOR MANUFACTURING A RUBBER STRIP

(75) Inventors: Jan Kornelis Grashuis, CG Apeldoorn (NL); Cornelis Wouteres Janszen, ZL Harderwijk (NL)

(73) Assignee: VMI Holland B.V., Epe (NL)

( * ) Notice: Subject to any disclaimer, the term of this patent is extended or adjusted under 35 U.S.C. 154(b) by 855 days.

(21) Appl. No.: 12/525,715

(22) PCT Filed: Feb. 6, 2008

(86) PCT No.: PCT/NL2008/050006
§ 371 (c)(1), (2), (4) Date: Jan. 4, 2010

(87) PCT Pub. No.: WO2008/105656
PCT Pub. Date: Sep. 4, 2008

(65) Prior Publication Data

US 2010/0112112 A1 May 6, 2010

(30) Foreign Application Priority Data

Mar. 1, 2007 (NL) .................................... 1033470

(51) Int. Cl.
*B29C 47/02* (2006.01)
*B29C 47/34* (2006.01)
*B29C 47/92* (2006.01)

(52) U.S. Cl.
USPC ........... 425/113; 425/141; 425/145; 425/204; 425/205; 425/209; 425/377; 425/382.3; 425/462

(58) Field of Classification Search
USPC ......... 425/113, 114, 141, 145, 204, 205, 207, 425/209, 377, 382.3, 462
See application file for complete search history.

(56) References Cited

U.S. PATENT DOCUMENTS 3,573,135 A 3/1971 Cooper et al.
4,209,476 A * 6/1980 Harris .......................... 264/40.4

(Continued)

FOREIGN PATENT DOCUMENTS

| | | | |
|---|---|---|---|
| DE | 44 31 922 | | 5/1996 |
| EP | 1 211 050 | | 6/2002 |
| GB | 919078 | | 2/1963 |
| JP | 56-142404 | * | 11/1981 |
| JP | 7-61711 | | 3/1995 |
| JP | 2005-205656 | | 8/2005 |

OTHER PUBLICATIONS

English Abstract of 2005-205656 dated Aug. 4, 2005.

(Continued)

*Primary Examiner* — Yongendra Gupta
*Assistant Examiner* — Joseph Leyson
(74) *Attorney, Agent, or Firm* — Ladas & Parry LLP

(57) ABSTRACT

Device (1) for manufacturing a rubber strip material comprising cord material. The device comprises an extruder (4) with an integrated gear pump (13) with adjustable pump speed and with a conveying screw for extruding unvulcanised rubber around the cord material for the purpose of producing a continuous rubber strip. The device furthermore comprises a control unit (15) for adjusting the pump speed of the gear pump, a measuring unit (16) for measuring the height and the width of the rubber strip and for emitting a measuring signal indicative of the measured height and width. The measuring unit can be connected to the control unit for adjusting the pump speed of the gear pump for emitting the measuring signal to it, wherein the pump speed of the gear pump can be controlled by the control unit at least based on the measuring signal.

7 Claims, 3 Drawing Sheets

(56) References Cited

U.S. PATENT DOCUMENTS

| | | | | |
|---|---|---|---|---|
| 4,741,621 | A | 5/1988 | Taft et al. | |
| 5,120,206 | A | 6/1992 | Greenstreet et al. | |
| 5,378,415 | A | 1/1995 | Gohlisch et al. | |
| 6,067,165 | A * | 5/2000 | Matsumiya et al. | 356/401 |
| 6,375,452 | B1 * | 4/2002 | Nissel | 425/377 |
| 2003/0051794 | A1 | 3/2003 | Suda et al. | |
| 2004/0032040 | A1 * | 2/2004 | Harris | 264/40.1 |

OTHER PUBLICATIONS

English Abstract of JP 7-61711 dated Mar. 7, 1995.

* cited by examiner

DEVICE FOR MANUFACTURING A RUBBER STRIP

The invention relates to a device for manufacturing a rubber strip material comprising cord material wherein the device comprises an extruder with a conveying screw for extruding unvulcanised rubber around the cord material for the purpose of producing a continuous rubber strip, wherein the extruder is provided with an integrated gear pump with adjustable pump speed, and a control unit for adjusting the pump speed of the gear pump. A cord material comprising such rubber strip material can in case of a so-called belt for instance be a rubber strip material that is reinforced with a cord, wherein the cord is formed by steel cords or synthetic fibers at an angle of for instance 15° to 70°, or in case of so-called "plies" by textile fibers at an angle of 80° to 90°.

Such a device is for instance known from the Japanese patent application 2005205656. In this document an extruder is described with a gear pump, the pump speed of which is adjustable. The adjustability is used to keep the volume of product to be delivered constant. When by the known device for instance belt layers of other sizes have to be manufactured, changing the settings for the extruder takes a lot of time during which the device is not productive.

The aim of the invention is among other things to improve on this.

To this end the present invention provides a device for making a rubber strip material comprising cord material, comprising the features according to claim 1. As a consequence of feeding of measured values of the height and width of the rubber strip back to the control unit it can be ensured that the extruder continuously produces rubber strips of reproducible quality, in that the dosage of the rubber is accurately controlled by varying the number of revolutions of the gear pump. By the very use of this specific type of extruder it is moreover possible that the device can comply with larger variations in demand and supply of rubber strips, while the quality of the produced rubber strips is still guaranteed. Moreover by using such an extruder it is possible to switch over much faster to other sizes of rubber strips (and consequently belt layers). In addition thereto it is possible because of the use of a gear pump to let the mastification take place independent from the dosage.

It is known per se from US patent application 2003/0051794 that the strip width is measured for controlling the speed of rollers between which the rubber strip is being passed. This document does not describe that the measured width can be used for controlling the pump speed of the extruder, nor does it describe that the height of the rubber strip is being measured.

BRIEF SUMMARY OF THE INVENTION

In an advantageous embodiment of a device according to the invention the device is provided with a pressure sensor for measuring the pressure at the end of the conveying screw of the extruder, and for emitting a pressure signal indicative of the measured pressure, wherein the pressure sensor can be connected to the control unit for adjusting the pump speed of the gear pump for emitting the pressure signal to it, wherein the pump speed of the gear pump can be controlled by the control unit at least based on the measuring signal, to keep the pressure at the end of the conveying screw constant. Because of this it can be ensured that a good adherence to the surface of the cord material is obtained.

The above-mentioned US patent application 2003/0051794 describes as such a pressure sensor that emits those measured values to a control unit because of which a uniform quantity of product is delivered per unit of time. So the measured values are not used to keep the pressure at the end of the conveying screw constant.

In a further embodiment of a device according to the invention or as an individual aspect of it, the device comprises a pull-out unit comprising a pull-out roller, driven by a motor, for pulling the rubber strip out of the extruder, wherein the motor is a controllable motor for driving the pull-out roller with controllable drive speed. By the very use of such a controllable motor it is possible for the device to comply with larger variations in demand and supply of rubber strips. Moreover by using such an extruder it is possible to switch over much faster to other sizes of rubber strips (and consequently belt layers).

In a further embodiment of a device according to the invention or as an individual aspect of it the device comprises a buffer unit provided with a number of lower and a number of upper reversing rollers, wherein the distance between the upper and lower reversing rollers is adjustable; and a distance measuring unit for measuring the distance between the upper and lower reversing rollers and for emitting a distance signal. By the very use of this distance measuring unit it is possible for the device to comply with larger variations in demand and supply of rubber strips. Moreover by using such an extruder it is possible to switch over much faster to other sizes of rubber strips (and consequently belt layers).

Here it is particularly advantageous when the distance measuring unit can be connected to the controllable motor of the pull-out unit, wherein the drive speed of the pull-out roller can be controlled at least based on the distance signal wherein in particular the controllable motor is adapted for emitting a drive speed signal indicative of the drive speed of the pull-out roller. Because of this it is possible to react to variations in demand and supply of the rubber strips in a most accurate and quick manner.

In particular when the device is provided with a means for emitting the drive speed signal to the control unit for adjusting the pump speed of the gear pump, wherein the pump speed of the gear pump can be controlled by the control unit at least based on the drive speed signal, the production of the rubber strips by the extruder can be accelerated or retarded, dependent upon the demand.

In an embodiment of a device according to the invention the measuring unit for measuring the height and width of the rubber strip comprises a laser and a camera, by which measuring values can be obtained in a quick and reliable manner, wherein in order to obtain highly accurate measuring values it is advantageous when the device is provided with a support for the rubber strip, which support also comprises an additional part that is not destined for supporting the rubber strip, which part has a reference cam with a reference width and/or a reference height, wherein the reference cam is arranged with respect to the measuring unit such that said reference cam can be measured by the measuring unit.

BRIEF DESCRIPTION OF THE DRAWINGS

The invention is further elucidated on the basis of an embodiment according to the invention, in which.

DETAILED DESCRIPTION OF THE INVENTION

Figure 1:
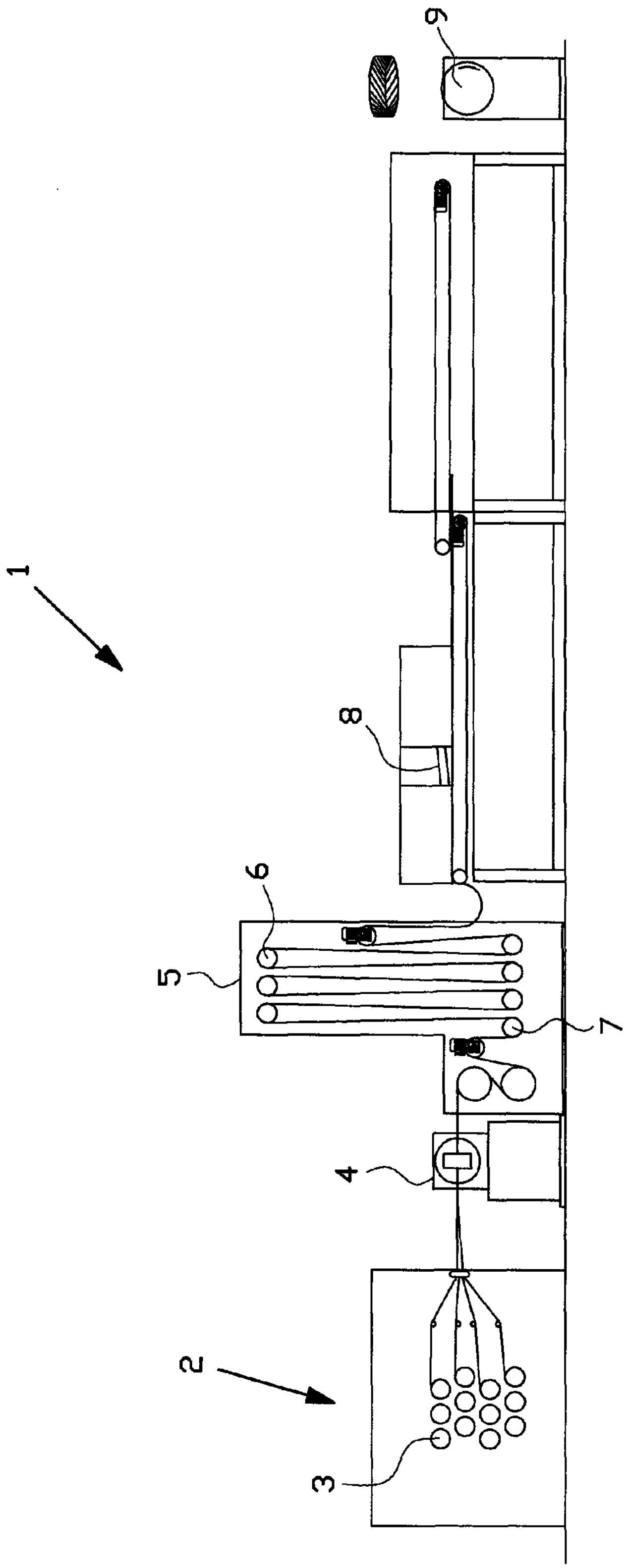
FIG. 1 is a schematic side view of a device for making a rubber strip material.

In FIG. 1 is depicted schematically in side view a device 1 for manufacturing a belt. The device 1 comprises an unwinding device 2 provided with reels 3 with cord material thereon. In general this cord material is steel cord, although synthetic cord material can be used as well.

The device 1 furthermore comprises an extruder 4 for extruding unvulcanised rubber around the cord material and a buffer unit 5, here provided with buffer loops, for buffering and cooling the extruded material. Here discontinuities in the process can be complied with as well. Because here the continuous rubber strip is provided with longitudinal wires, the rubber strip is hardly prone to extension or other deformations. The buffer unit 5 is provided with a number of upper and lower reversing rollers 6, 7, wherein the distance between the upper and lower reversing rollers is adjustable.

The resulting, continuous rubber strip with embedded longitudinal cords is subsequently fed in a manner that is known per se to among other things a cutting device 8 for further processing. On the basis of juxtaposed cut-off pieces of rubber strips a rubber strip material is produced, in a manner that is known per se, at the required length and width on the conveyor belt after the cutting device, and subsequently arranged on a construction drum 9 (FIG. 1).

Figure 2:
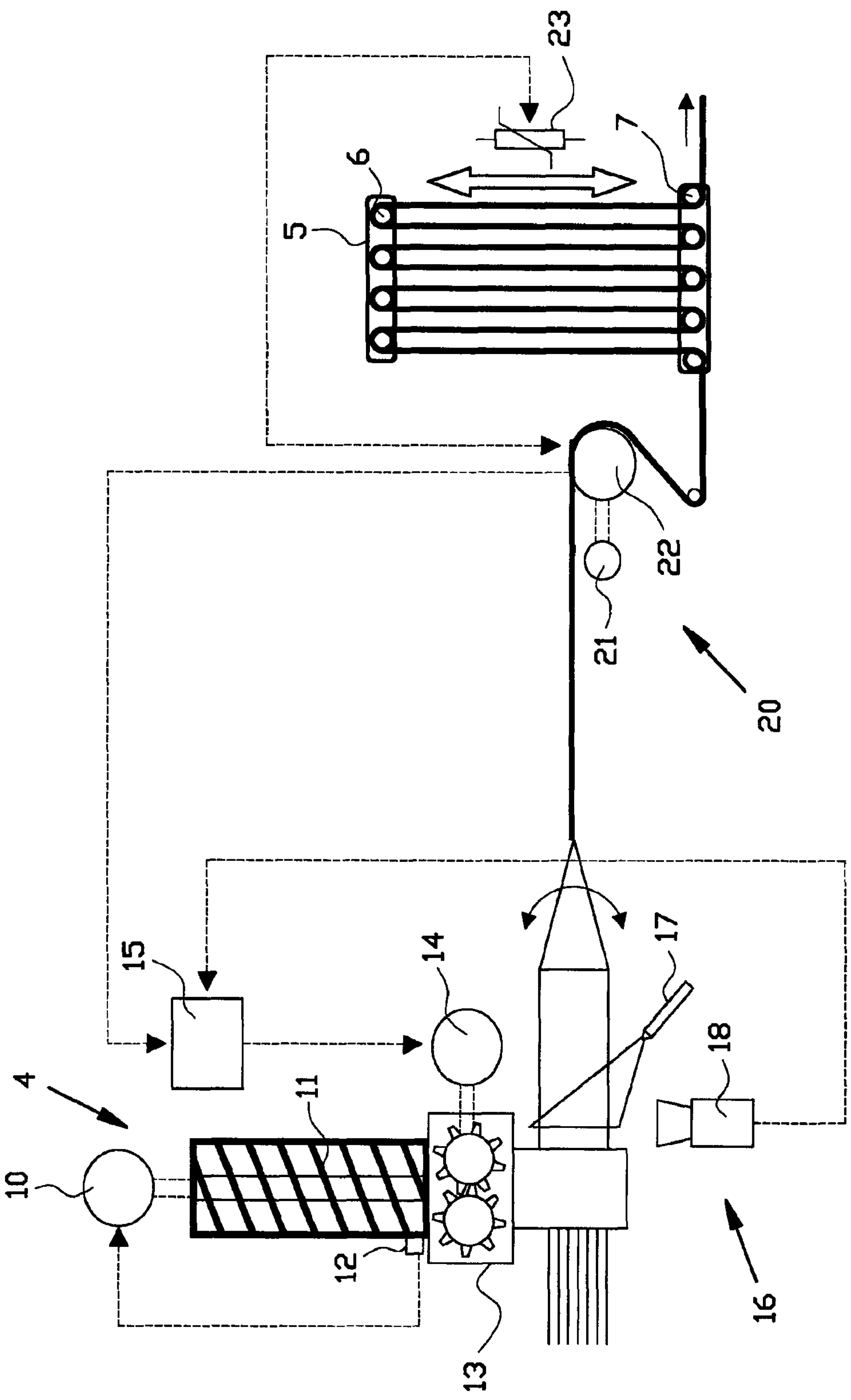
FIG. 2 is a schematic representation of the control of the settings for among other things the extruder.

In FIG. 2 is depicted schematically the control of the settings for among other things the extruder 4.

The extruder 4 comprises a conveying screw 11 driven by a first controllable motor 10 for extruding unvulcanised rubber round the cord material for the purpose of producing a continuous rubber strip. The screw 11 takes care of mixing, stirring, heating and feeding rubber material to the gear pump 13. Here the rotational speed of the conveying screw 11 is controlled in a manner that is known per se, to keep the so-called barrel pressure P1, that is present at the end of the conveying screw, constant for a good mastification of the rubber for the purpose of obtaining the correct viscosity and adhesion, so that a good adherence to the surface of the cord material is obtained. To this end the extruder is provided with a pressure sensor 12. The extruder 4 furthermore comprises an integrated gear pump 13, the pump speed of which is adjustable by a second controllable motor 14. The pressure (P2) in the gear pump 13 ensures a good adherence of the rubber to the cord material. Such an extruder with integrated gear pump can be obtained for instance through VMI-AZ Extrusion GmbH under the name Planetruder®.

The second controllable motor 14 is driven by a control unit 15 for adjusting the pump speed of the gear pump 13.

Figure 3:
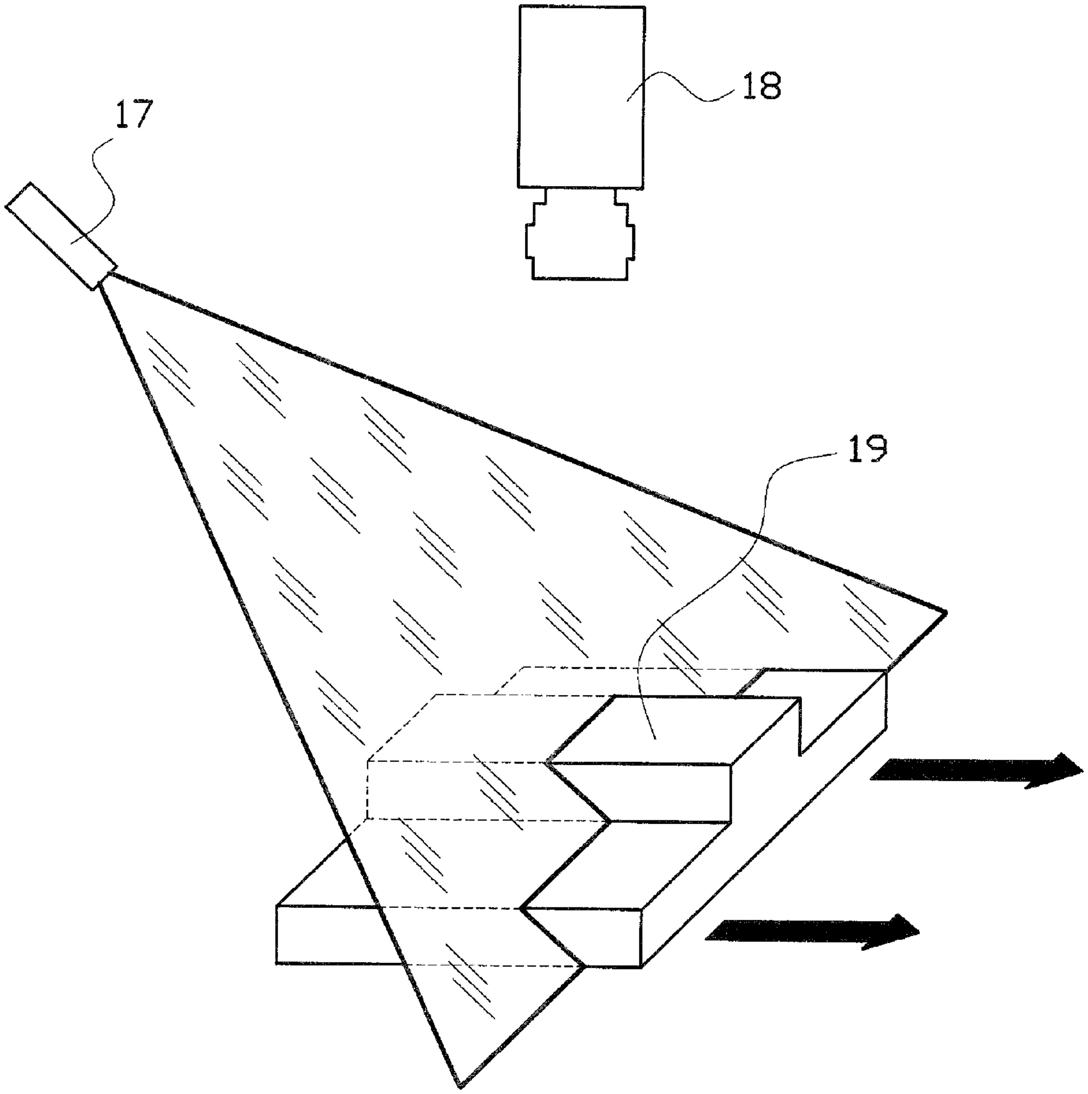
FIG. 3 is a schematic perspective view of a reference cam.

A measuring unit 16, comprising a laser 17 and a camera 18 in the depicted embodiment, measures the height and the width of the rubber strip and emits a measuring signal to the control unit 15, which measuring signal is indicative of the measured height and width. For the purpose of enhancing the measuring accuracy a reference cam 19 with a reference width and a reference height can be arranged on a support (not depicted in the figures) for the rubber strip (FIG. 3). The reference cam 19 is arranged for instance on an additional part of the support, that is preferably not destined for supporting the rubber strip. The reference cam 19 is arranged with respect to the measuring unit 17, 18 such that said reference cam 19 can be measured by the measuring unit. The reference cam 19 may be arranged at the ridge of the rubber strip. In case two spaced apart rubber strips are manufactured, the reference cam may also be placed between the rubber strips. It was found that the reference cam can be percepted well when there is a prominent difference in height. Here for instance the upper surface of the reference cam is situated under the upper surface of the rubber strip. Furthermore the stepped configuration of the reference cam 19 is open to many variations. Thus a reference cam with a single height can be applied as well.

The control unit 15 can comprise a suitable algorithm, to be determined experimentally, for determining on the basis of the measured height and width a control signal for adjusting the pumping speed of the gear pump 13 dependent upon the measuring signal. Because of this the dosage of the rubber is controlled in a manner independent from the rotational speed of the conveying screw 11.

A pull-out unit 20, comprising a pull-out roller 22 driven by a third controllable motor 21, pulls rubber strips out of the extruder 4. A distance measuring unit 23 measures the distance between the upper and lower reversing rollers 6, 7 of the buffer unit 5, and emits to the pull-out unit 20 a distance signal that is indicative of it. In other words the distance measuring unit 23 can be connected to the controllable motor 21 of the pull-out unit 20, wherein the drive speed of the pull-out roller 22 can be controlled at least on the basis of the distance signal. Because of this the drive speed of the pull-out roller 22 is controlled dependent upon the filling of the buffer unit 5.

In the depicted embodiment the pull-out unit 20, in particular the controllable motor 21, is adapted for emitting to the control unit 15 a drive speed signal that is indicative of the drive speed of the pull-out roller. Because of this the pump speed of the gear pump 14 can be controlled at least on the basis of the drive speed signal of the pull-out motor 21.

Because of the above described device an extremely large control range (5-100% of the production speed) can be realised wherein a rubber strip with reproducible shape and degree of mastification can be obtained all the same.

The above description is included to illustrate the operation of preferred embodiments of the invention and not to limit the scope of the invention. Starting from the above explanation many variations that fall within the spirit and scope of the present invention will be evident to an expert, in particular as defined in the accompanying claims.

The invention claimed is:

1. Device for manufacturing a rubber strip material comprising cord material, wherein the device comprises:

an extruder with a conveying screw for extruding unvulcanised rubber around the cord material for the purpose of producing a continuous rubber strip, wherein the extruder is provided with an integrated gear pump with adjustable pump speed, a control unit for adjusting the pump speed of the gear pump, wherein the device further comprises:

a pull-out unit comprising a pull-out roller, driven by a motor, for pulling the rubber strip out of the extruder, wherein the motor is a controllable motor for driving the pull-out roller with controllable drive speed;

a buffer unit provided with a number of lower and a number of upper reversing rollers, wherein the distance between the upper and lower reversing rollers is adjustable; and a distance measuring unit for measuring the distance between the upper and lower reversing rollers and for emitting a distance signal;

wherein the pull-out unit is placed between the extruder and the buffer unit; and wherein the distance measuring unit can be connected to the controllable motor of the pull-out unit, wherein the drive speed of the pull-out roller can be controlled at least based on the distance signal.

2. Device according to claim 1, wherein the controllable motor is adapted for emitting a drive speed signal indicative of the drive speed of the pull-out roller.

3. Device according to claim 2, wherein the device is provided with a means for emitting the drive speed signal to the control unit for adjusting the pump speed of the gear pump, wherein the pump speed of the gear pump can be controlled by the control unit at least based on the drive speed signal.

4. Device for manufacturing a rubber strip material comprising cord material, wherein the device comprises:

an extruder with a conveying screw for extruding unvulcanised rubber around the cord material for the purpose of producing a continuous rubber strip, wherein the extruder is provided with an integrated gear pump with adjustable pump speed, a control unit for adjusting the pump speed of the gear pump, wherein the device furthermore comprises:

one measuring unit for measuring both the height and the width of the rubber strip and for emitting a measuring signal indicative of the measured height and width, wherein the measuring unit can be connected to the control unit for adjusting the pump speed of the gear pump for emitting the measuring signal to it, wherein the pump speed of the gear pump can be controlled by the control unit at least based on the measuring signal, wherein the measuring unit for measuring the height and width of the rubber strip comprises a laser and a camera, wherein the device is provided with a support for the rubber strip, which support also comprises an additional part that is not destined for supporting the rubber strip, which part has a reference cam with a reference width and/or a reference height, wherein the reference cam is arranged with respect to the measuring unit such that said reference cam can be measured by the measuring unit.

5. Device according to claim 4, wherein the device comprises a support for supporting the rubber strip, wherein the laser is placed under an oblique angle with respect to the support.

6. Device according to claim 4, wherein the one measuring unit is arranged for measuring both the height and the width of the rubber strip and the reference height and a reference width of the reference cam.

7. Device according to claim 4, wherein the reference cam has a difference in height with respect to the rubber strip, such that the reference cam can be perceived well by the measuring unit.

* * * * *